United States Patent [19]

Simon

[11] 4,177,863

[45] Dec. 11, 1979

[54] SAFETY LIQUID DISPENSER

[76] Inventor: Sydney Simon, 936 Oranmore St., Pittsburgh, Pa. 15201

[21] Appl. No.: 780,801

[22] Filed: Mar. 24, 1977

Related U.S. Application Data

[63] Continuation-in-part of Ser. No. 661,754, Feb. 26, 1976, Pat. No. 4,019,583, which is a continuation-in-part of Ser. No. 624,161, Oct. 20, 1975, Pat. No. 4,019,649, which is a continuation-in-part of Ser. No. 550,889, Feb. 19, 1975, Pat. No. 4,000,726.

[51] Int. Cl.$^2$ .............................................. A62C 35/12
[52] U.S. Cl. ........................................ 169/62; 169/66; 169/85; 220/900; 220/88 R
[58] Field of Search ............... 169/62, 66, 68, 27, 169/85, 88; 220/63 A, 88 R, 88 B; 280/736, 441

[56] References Cited

U.S. PATENT DOCUMENTS

| | | | |
|---|---|---|---|
| 1,015,987 | 1/1912 | Bijur et al. | 169/88 |
| 1,139,353 | 5/1915 | Ellis | 220/88 R X |
| 1,779,786 | 10/1930 | Unzue | 220/88 R X |
| 1,793,860 | 2/1931 | MacGregor | 169/85 |
| 2,710,658 | 6/1955 | Huthsing et al. | 169/88 |
| 3,738,428 | 6/1973 | Ingro | 169/62 X |
| 3,788,666 | 1/1974 | Kramer | 169/62 X |
| 3,827,455 | 8/1974 | Lee | 220/88 R X |

FOREIGN PATENT DOCUMENTS

| | | | |
|---|---|---|---|
| 1505613 | 1/1970 | Fed. Rep. of Germany | 220/88 R |
| 325637 | 2/1930 | United Kingdom | 169/62 |

*Primary Examiner*—John J. Love

[57] ABSTRACT

An improved inflammable liquid safety tank comprising a double walled tank body with the tank walls being interconnected by support plates. An intermediate container is formed by the inner wall structure of the tank and is adapted to hold inflammable liquid. A pressurized gas bottle is threadably mounted to a sleeve secured to and extending into the intermediate container. The pressurized gas bottle is selectively connected to the intermediate container to pressurize liquid held in the intermediate container. The pressurized gas bottle also communicates with the tank to pressurize a foam, nonflammable fluid, or cleaning agent placed in the chamber or outer compartment defined by the outer wall structure of the intermediate container and the inner wall structure of the tank body so that the foam, fluid or agent will be expelled from the tank if the tank wall is accidentally punctured. The outer compartment is preferably pressurized at a lower pressure than the intermediate container. A conduit is connected to an inlet/discharge fitting and extends into the intermediate container adjacent the floor of the intermediate container and below the level of liquid placed in the intermediate container. A flexible hose with an adjustable nozzle is mounted to the tank body for selective communication with either the outer compartment or the intermediate container so that the material contained within either of the containers can be selectively discharged from the nozzle.

16 Claims, 8 Drawing Figures

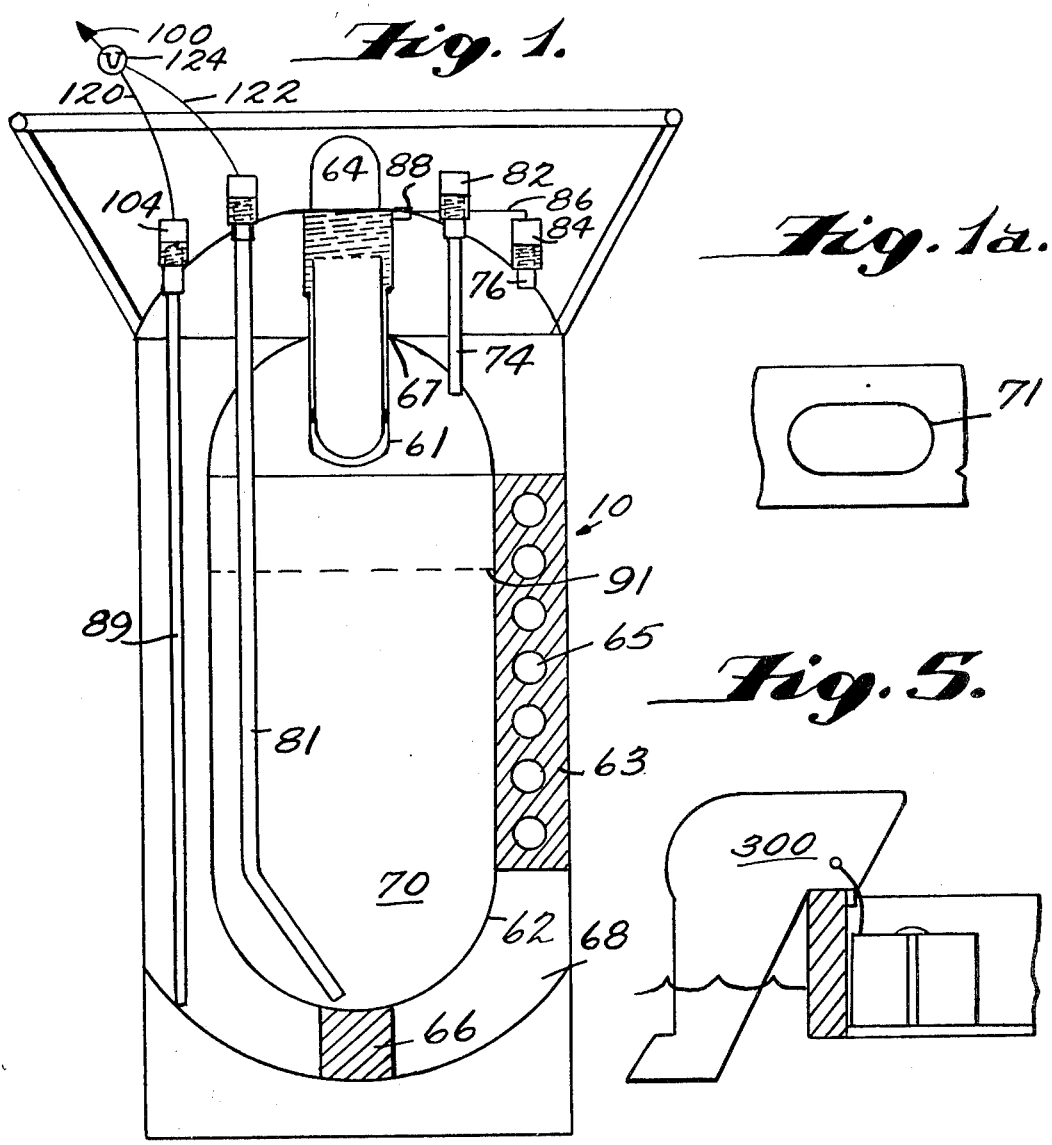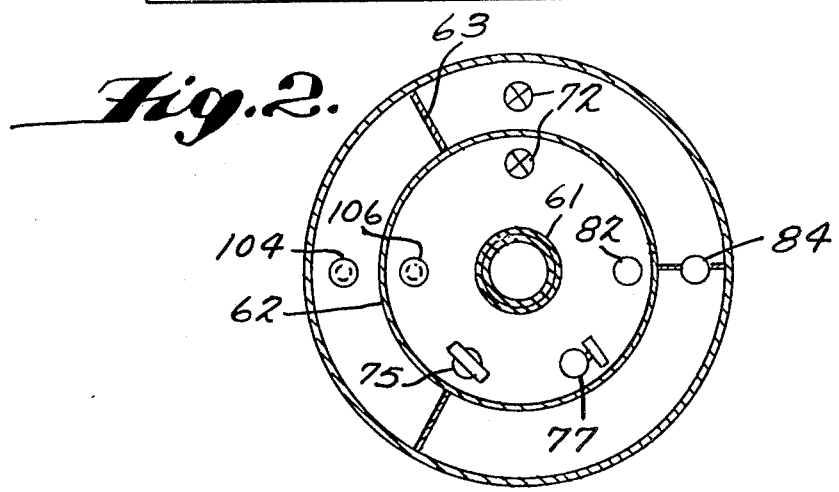

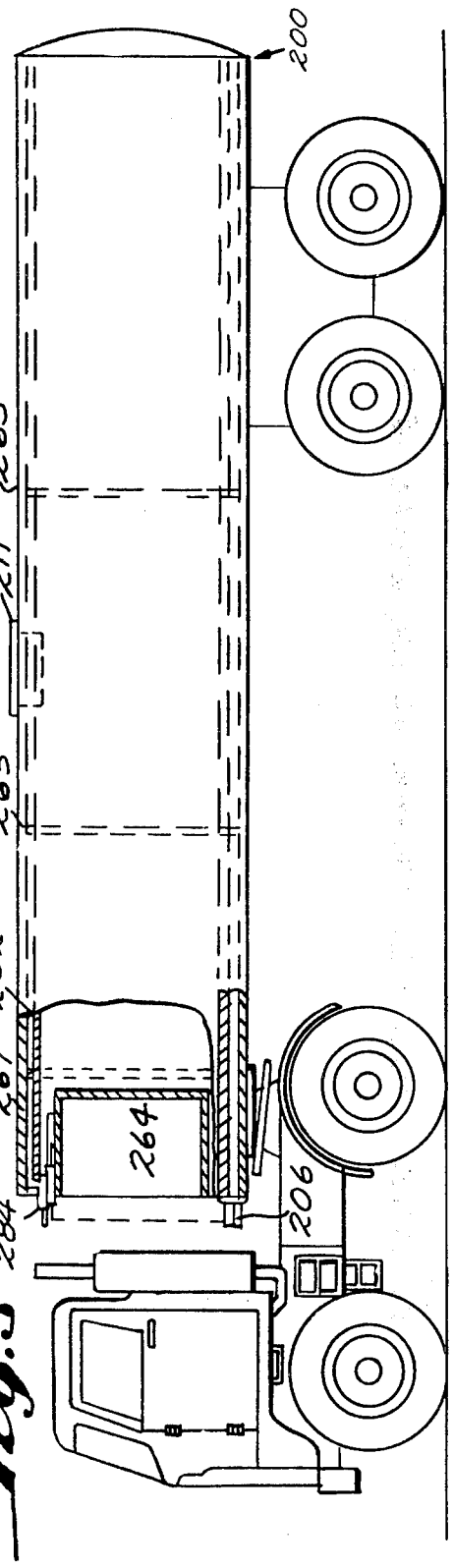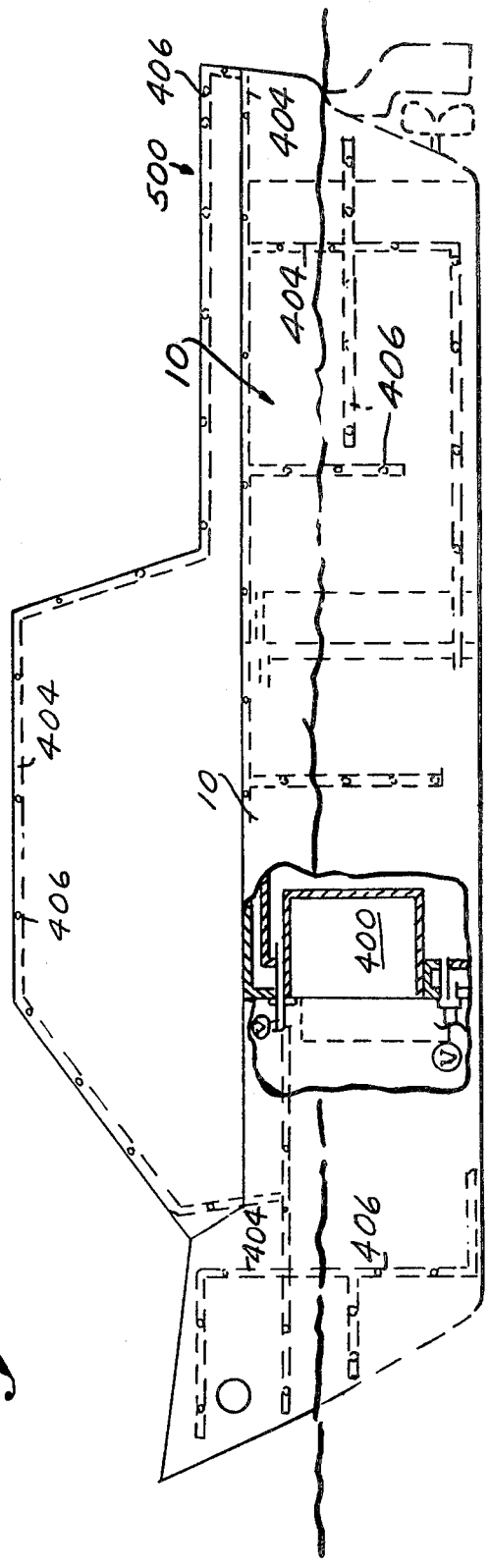

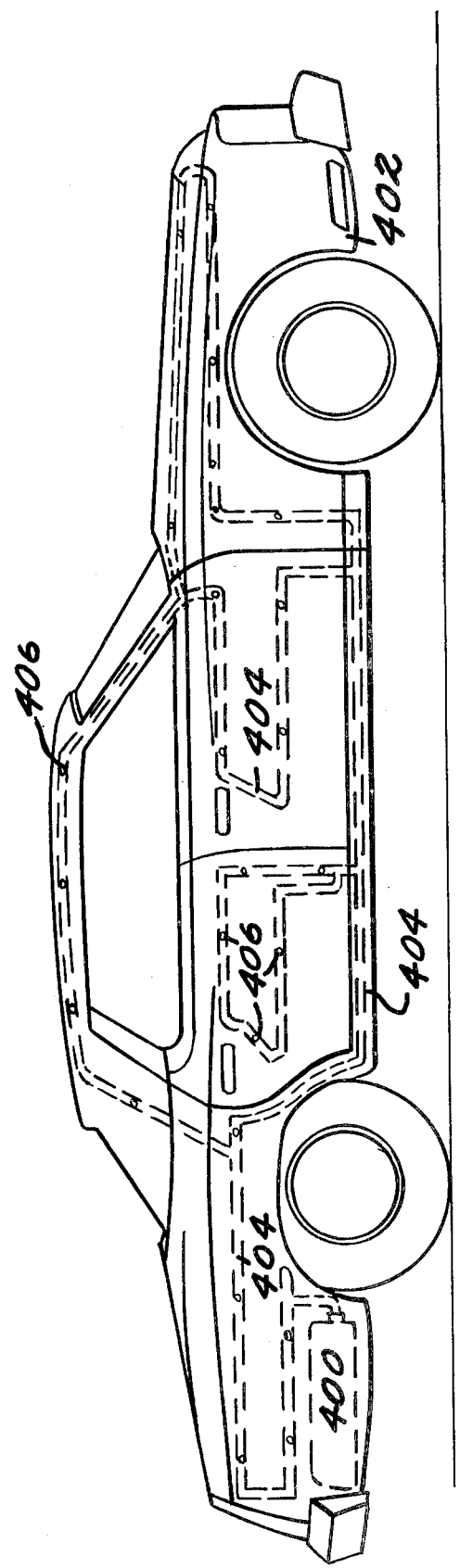

SAFETY LIQUID DISPENSER

CROSS REFERENCE TO RELATED APPLICATIONS

This is a continuation-in-part of application Ser. No. 661,754 filed Feb. 26, 1976 now Pat. No. 4,019,583 which is a continuation-in-part of application Ser. No. 624,161 filed Oct. 20, 1975, now Pat. No. 4,019,649 which is a continuation-in-part of application Ser. No. 550,889 filed Feb. 19, 1975 now Pat. No. 4,000,726.

BACKGROUND OF THE INVENTION

The invention generally relates to containers for combustible liquids and more specifically relates to a combination fluid safety storage tank adapted to hold two separate materials. The tank is constructed so that the explosion hazards inherent in the design of a storage tank for inflammable fluids are substantially eliminated allowing the storage tank to be used in an automobile, airplane, motor boat, or other moving vehicle or simply as a storage device.

The safety storage tank is normally used for the storing of volatile fuels such as gasoline or other inflammable materials such as paint.

The term paint as used in the application is intended to be a generic term and should be construed to have a broad meaning encompassing lacquers, primers, latex, enamels, sealers, stains, varnish, metallic based coatings and other similar materials.

In ordinary conditions in the storage of inflammable liquids, air usually enters the tank as the liquid is removed from the tank. Under such conditions the upper part of the partially filled tank contains a dangerous explosive mixture of the inflammable liquid vapor and air. If a spark occurs in the upper part of the tank through the electrical discharge of static electricity or from contact with other structures, fire and explosion will result.

The present invention eliminates this explosive hazard by unique construction of the tank in that the air is replaced in the space above the inflammable liquid by an inert gas such as carbon dioxide or nitrogen which is heavier than air and which will not form an explosive mixture with the inflammable liquid. The carbon dioxide is pressurized and a source of it is attached to the tank so that it automatically replaces the liquid as the liquid is discharged from the tank.

DESCRIPTION OF THE PRIOR ART

It is known in the prior art to place an inert gas in a storage tank to alleviate the explosive characteristics of the tank. U.S. Pat. No. 2,153,555 discloses a tank in which the area in the space above the gasoline is replaced by an inert gas which is carbon dioxide. In this patent the gasoline is withdrawn by a pipe (not shown) and the carbon dioxide is used to fill the vacuum created in the tank by the discharged gas. A similar system is shown by U.S. Pat. No. 2,406,373 which discloses a fixed fuel vapor purging apparatus with a vapor diluting medium such as carbon dioxide under pressure. Another system is shown by U.S. Pat. No. 3,606,709 which teaches that there is a danger of an explosion in such a tank through the accumulation of static electricity built up by the incoming inert gas in the tank. This patent teaches that static electricity can build up into a spark discharge especially when gas input velocity is high and the carbon dioxide is derived from a source in liquid or solid state. This problem is solved by the use of the fixed emergency discharge facility which eliminates the spark discharge through the use of a complex bath expansion chamber mounted on the roof of the tank.

U.S. Pat. No. 3,419,193 discloses an apparatus for dispensing fluid material from a container wherein the container with its top open is enclosed in an open topped vessel, the vessel is sealed in fluid tight manner by means of a removable top closure.

U.S. Pat. No. 3,527,391 teaches a means for expelling liquid from a container by applied external pressure.

In any of the above described tanks a puncture of the tank will result in the pressurized gas propelling the gasoline out of the tank in a high pressure stream.

If this stream of fuel is ignited by a spark, static electricity, heated manifold or other fire inducing medium the result is much like a flame thrower in that all areas in the path of the fuel stream are ignited by a burning fuel. Thus while the danger of fuel explosion has been decreased within the tank the danger of combustion outside the tank is greatly increased upon rupture of the tank. The present invention overcomes this problem by providing a safety tank which significantly eliminates the danger of internal and external combustion while also providing the option of using the tank as a fire extinguisher, painting apparatus or other portable liquid discharging unit.

SUMMARY OF THE INVENTION

The present invention utilizes a specific safety tank construction so that the combination of the carbon dioxide with an inflammable liquid such as gasoline and the input of carbon dioxide overcomes previous problems found in the prior art. In the present invention a carbon dioxide bottle, used to pressurize the liquid, is positioned in a sleeve inside an intermediate container of the tank body. The inert gas, held by the pressurized carbon dioxide bottle, can be selectively delivered to the compartments of the tank by means of conduits extending below the surface of liquid held in the compartments to cool the liquid and discharge static electricity carried by the inert gas before the carbon dioxide gas contacts the vapor zone of the tank. The inert gas can selectively be fed directly into the top portions of the compartments if such is desired. The gas flow conduits can serve as both a carbon dioxide gas flow conduit and liquid carrying conduits depending upon their intended use. When the gasoline conduit operates to carry carbon dioxide gas, the gas is bubbled up through the gasoline thereby cooling it and consequently keeping the fuel vapors down. This under-liquid discharge prevents the heavier carbon dioxide from forming an air lock, thus preventing one source of explosion.

When the conduit operates as a liquid carrying conduit the carbon dioxide previously entrained in the pipe when the tank was initially pressurized operates as a safety device against leakage since the carbon dioxide will be expelled before the liquid thus making it easier to determine leakage before the actual liquid leakage takes place.

In addition the use of an outer pressurized foam or cleaning agent compartment in the tank reduces the danger from puncture of the outer tank wall. The cleaning agent can also be used to act as a fire extinguisher if an outer remote blaze arises. If the gasoline or fuel container is punctured in addition to the outer wall then the foam or cleaning agent will mix with the inflammable liquid to retard combustion of the fuel as it is expelled into the atmosphere. Conversely, when the apparatus is used for painting, the outer compartment can be used to clean the spray nozzle.

The outlets of the double walled tank are provided with quick disconnect hose connections leading to a nozzle. The nozzle is valved so that the operator can select which material is desired to be discharged from its particular container.

The tank is also provided with a release valve in each of the compartments which will allow excess pressure to escape from either of the tank compartments which are preferably kept at unequal pressures. A pressure indicating gauge is connected to the release valves to indicate to the operator the current pressure in each of the compartments of the tank.

Inlet connectors are provided on the tank to allow inlet gas or other materials to be fed into the respective containers of the tank. Liquid level valves are contained within the tank with the gauges preferably being set next to the inlet connections.

The use of a flexible conduit attached to the input-output valves of the tank allows it to be completely portable and reachable in areas which would be inaccessable with known prior art apparatus.

A conduit extends into the foam compartment through which the foam is expelled. A flexible hose is connected to the conduit, the nozzle of which can then be directed to the situs of a fire.

Thus the simple sturdy construction of the tank results in a strong structure able to withstand various pressures.

In the preferred embodiment, the tank is provided with a circular handle in the form of metal tubing which is supported above the surface of the tank by a plurality of outwardly extending brackets. The diameter of the circular handle is greater than the outside diameter of the tank body. The circular handle thus provides a convenient gripping means for transportation, protection for the tank's gauges and flexible conduit lines from foreign objects should the tank become accidentally moved from its upright position and additionally allows the tank to always remain in a relatively upright position even if accidentally knocked over.

It is desired that the tank always remain with the flexible disconnects above the surface of the ground in order to prevent liquid from coming in contact with these units. If liquid should come in contact with these units then pressure could conceivably blow liquid out through the disconnects if they were accidentally hooked up incorrectly. Thus the handle serves an important safety function in addition to its function as a convenient gripping means for facilitating transportation.

The outwardly extending brackets extend at an angle of 60° with respect to a horizontal plane passing through the tank. As previously mentioned, the handle is a larger diameter than the diameter of the tank. If the tank is inadvertantly knocked from its upright position then the handle will prevent the side of the tank from resting flush on the ground surface. The side of the tank is thus supported above the ground by the bottom edge of the tank and the circular handle. With the tank in the above ground position, the bracket defines approximately a 45° angle with respect to the ground. With the handle thus supported, it is extremely easy to pick up the tank from any position.

In an alternate embodiment of the invention, the safety tank can be manufactured as the gasoline tank of an automobile. Thus if the car rolled over an embankment, the foam held within the outer compartment of the safety gas tank would significantly retard combustion of the gasoline. This retardation of the gasoline combustion could quite possibly enable the occupants of the automobile to escape serious harm.

The automobile embodiment is provided with a series of connecting conduits extending throughout the car body. The foam of the outside chamber of the safety tank is thus in communication with the conduits. A plurality of fusible links or heat sensitive valves, similar in function to those used in internal building sprinkler systems, are used in connection with the conduits. When the heat from the automobile reaches a predetermined critical temperature, the fusible links will melt or the heat sensitive valves will sense the increase in temperature and thereby open allowing the foam to emanate through the conduits and retard or extinguish a fire. In this manner, a potentially hazardous fire or explosion can be extinguished or lessened.

If the gasoline safety tank is used as the automobile gasoline tank, then the internal container which generally holds pressurized $CO_2$ can serve a dual function. Not only would the pressurized $CO_2$ be able to pressurize the gasoline holding container and thereby eliminate gasoline vapors, but the $CO_2$ could also be connected to a passenger safety system, i.e., an air bag. The automobile could be provided with several impact sensitive devices at various key locations such that upon a predetermined minimum impact force the $CO_2$ will pass through a valve, now open due to the impact sensitive devices, and fill up and inflate the air bag.

It should be appreciated that the above mentioned additional functions of the safety gas tank installation in an automobile are all totally functional uses of the system without compromising the safety characteristics of the safety tank itself. Thus it can be seen that one installed safety tank can perform a plurality of functions while simultaneously preserving the safety characteristics of a gasoline tank.

The invention will further be described with reference to the accompanying drawings of which:

BRIEF DESCRIPTION OF THE DRAWINGS

FIG. 1 shows a schematic cross-sectional view of the double walled storage tank;

FIG. 1a discloses a fragmented elevational view of an alternate embodiment of the handle of the storage tank;

FIG. 2 is a top plan view of the storage tank body shown in FIG. 1;

FIG. 3 is a side elevational view partially in section of the double walled storage tank used in a tank truck embodiment;

FIG. 4 is a side elevational view partially in section of the double walled storage tank used in a boat embodiment;

FIG. 5 is a side elevational view of the double walled storage tank used in a motor boat embodiment;

FIG. 6 is a perspective view, partially in section of the double walled storage tank used in an automobile with a series of interconnecting conduits being shown.

Figure 7:
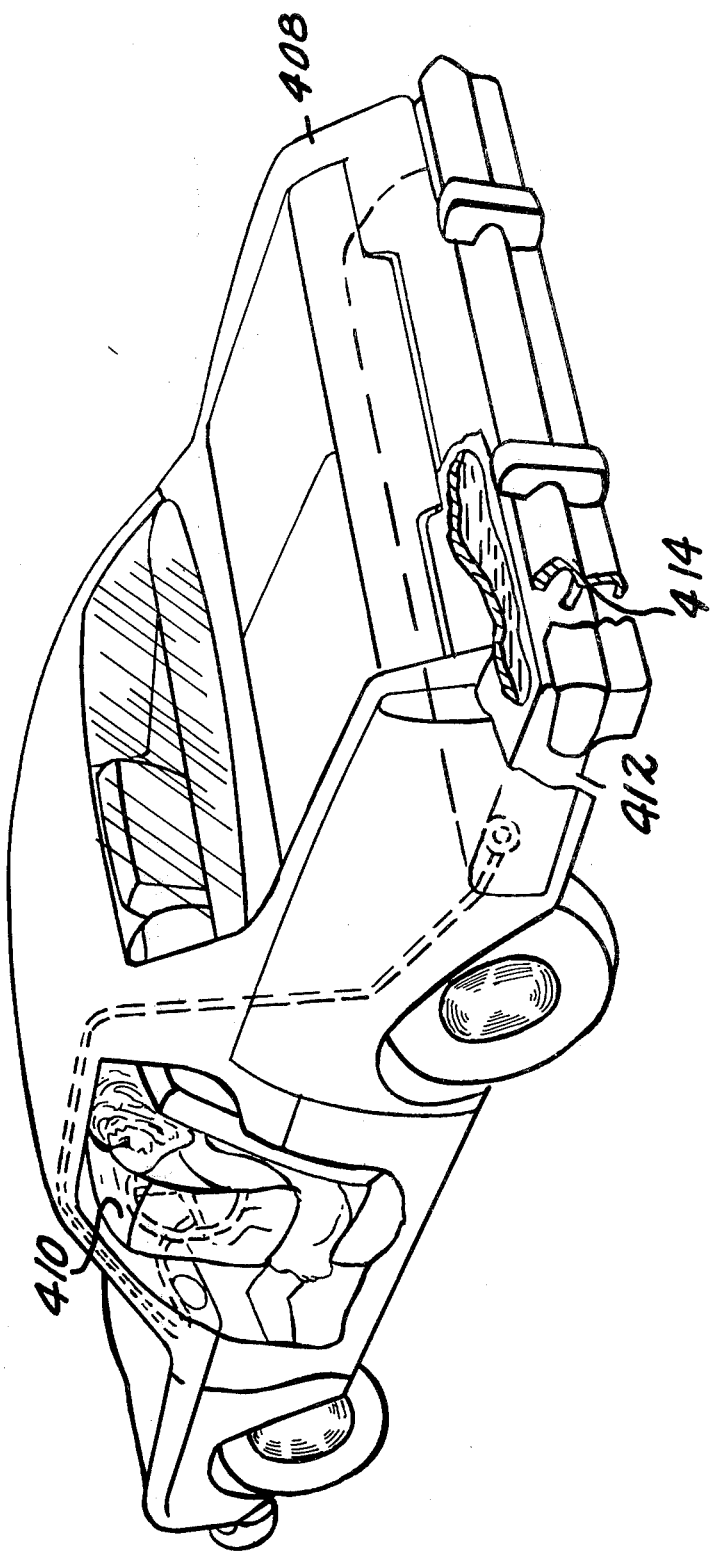
FIG. 7 is a perspective view, partially in section of the double walled storage tank used in an automobile with the tank being connected to a passenger restraint system.

DETAILED DESCRIPTION OF THE DRAWINGS:

The present invention as shown by the drawings discloses a safety tank 10 comprising a tank body 60, and an intermediate smaller diameter cylindrically shaped container 62 mounted within the body 60 on a sleeve 61. Container 62 is supported and connected to body 60 by a plurality of support plates 63 which run longitudinally along the body 60 and intermediate container body 62 and interconnect the two. Each plate or fin 63 has a plurality of apertures 65 cut therein which allow the material held in the outer compartment to flow freely through the outer compartment. The intermediate container is seated on a seat 66 formed from a cut pipe member to provide additional support to the container body within the tank body. A pressurized gas container 64 is threadably mounted in the sleeve 61 which preferably takes the form of a cylinder with a closed end. The sleeve 61 is preferably welded to the intermediate container tank body as indicated by numeral 67. However, if the walls of the tank are thick enough to support threading, the sleeve 61 could be threaded and screwed into the inner walls to provide an air tight seal.

The walls forming intermediate container 62 must have a wall thickness which provides suitable support to maintain liquids contained therein under 100 psi pressure. While it has been found that the invention has worked well under a 60 psi pressure the intermediate container should be capable of holding at least a 250 psi pressure. Thus any material such as plastic or metal which would be able to withstand pressures of this magnitude and not be affected by the corrosive nature of the various volatile fuels would be acceptable.

The outer compartment 68, formed by the intermediate container outer surface and the tank body inner surface which preferably holds the foam material, is preferably pressurized at a higher pressure than the intermediate container. This pressurization is an additional safety precaution to keep the inflammable liquid from leaking into the outer compartment if there is a slight rupture in the intermediate container. Thus the preferred embodiment would have container 64 at 1000 psi; the intermediate container at 60-150 psi and the outer compartment at 200 psi.

As best shown in FIG. 1, the tank 10 is provided with a circular carrying handle 12. The circular carrying handle 12 is constructed of metal tubing. The handle 12 is supported above the surface of the tank by a plurality of mounts 14. The mounts 14 are connected to the exterior wall of the tank and the handle by suitable conventional means as by welding. The longitudinal axis of the mounts extend, in the preferred embodiment, at a 60° angle to a horizontal plane. The diameter of the carrying handle 12 is greater than the outside diameter of the tank body. Thus it can be seen that a handle for facilitating transportation is disclosed. Additionally, the handle 12 serves to protect the flexible lines and the quick disconnect couplings 82, 84, 104 and 106. In transporting the tank body, the handle 12 prevents foreign objects from coming into contact with the disconnect couplings and release valves and possibly damaging the same.

If the tank is accidentally knocked over onto its side, the fact that the diameter of the handle is greater than the diameter of the tank body precludes the possibility of the disconnects coming into contact with any liquid which may be present on the ground. If liquid comes into contact with these units pressure could conceivably blow liquid out through the disconnects if they were accidentally hooked up incorrectly. Thus the handle provides an added safety feature plus a handle for facilitating transporation in addition to providing protection to the gauges located in the center of the tank.

Thus it can be seen that if the tank is accidentally overturned then the quick disconnects and $CO_2$ bottle will be supported above the ground due to the fact that the circular handle is of a greater diameter than the diameter of the tank body. When the tank is overturned, it will be supported by two points i.e., the intersection of the circular base with the exterior side wall of the tank and the exterior edge of the circular handle. The mount opposite the mount proximate to the ground will be at an angle of 45° with respect to the ground when the tank is turned on its side which substantially facilitates gripping of the handle and tank from any location for immediate uprighting.

In an alternate embodiment, four carrying handles 71 formed by cutting out portions of the tank body are provided upon the upper or outer surface of the tank body 60 as seen in FIG. 1a for facilitating transportation of the portable tank. Brackets (not shown) are secured to the outer surface of the tank to hold the flexible discharge hoses when they are not being used.

Two pressure release valves 72, communicate with the intermediate container 62 and the outer compartment 68 to limit the pressure in these areas. The pressure release valves are set to release gas at a set desired pressure, as for example, 225 psi to prevent carbon dioxide buildup from the carbon dioxide container 64 into the container 62 and compartment 68. Conduits 74 and 76 are constructed to receive a funnel, through which gasoline, paint, foam or other material may be poured for filling each respective compartment. A fluid level indicator 75 extends into the chamber 70 of the intermediate container 62 to measure the level of the liquid or material contained in the chamber. The gauge is preferably of a float type construction.

All of the conduits 74, 76, 81 and 89 are provided with quick disconnect couplings 82, 84, 104 and 106 of a standard manufacture which allows flexible conduits having quick disconnect ends to be coupled from the pressurized gas container 64 to a respective coupling so that gas can be discharged to pressurize either or both compartments depending upon the valve setting. An alternate transfer line 86 intersected by valve 88 leads from the carbon dioxide container 64 to conduits 74 and 76 so that continuous or selective pressure can be applied to either of the compartments without the need for transferring the flexible conduit. However the pressure of either compartment 62 or compartment 70 can be varied before or during use to accomodate various requirements and materials.

An outlet valve 77 communicates with both compartments and functions as a vapor bleed-out valve for both compartments 62 and 70. This allows vapors to be bled off while the compartments are being pressurized. The valve can be selectively set for either compartment, or for both compartments. If desired the valve may only communicate with compartment 70. Carbon dioxide, nitrogen, or any other suitable inert gas is provided in the threaded inner container 64 by prefilling the container or cartridge 64 and then mounting the same into the threaded sleeve 61. The compartment 68 formed by the inner surface of the tank body and outer surface of the intermediate container can be filled with foam pressurized by an inert gas such as carbon dioxide through its respective quick disconnect coupling 76 via flexible interchangable line 96 or through an alternative permanent feeder connecting line 86. Valve assembly 88 can direct selective gas pressure flow from container 64 to either of the two compartments 68 or 70. Valve assembly 88 is also constructed to selectively stop gas flow into either of the compartments. If paint is contained in the intermediate container 62 then compartment 68 can be filled with a cleaning agent which can be selectively run through the line 120 and nozzle 100 in order to clean the nozzle.

When the carbon dioxide is discharged into the bottom of the tank through conduit 81, the gas vapors rise, opening the pre-set outlet valve 77 which lets the excess air out of the intermediate container so there will be no air locks. Since the air is lighter than the carbon dioxide the air will be forced upward and out of the outlet release valve 77. The elimination of air locks thus cuts down the potential of explosions. This bubbling cools the volatile liquid and diminishes the occurrance of a gasoline vapor-carbon dioxide environment at the top of the intermediate container since the cooler the gasoline the lower the vapor pressure. This further eliminates possible explosions when spark discharges occur. Furthermore, the bubbling provides an effective means of discharging static electricity within the intermediate container as the static electricity created by the incoming carbon dioxide is discharged within the liquid. Thus there is no build-up of static electricity causing a discharge spark to go into the vapor which is highly explosive. The bleeder valve 77 also functions as a gauge so that the pressure of the gas on the liquid gasoline or the pressure under which the gasoline is placed can be quickly determined. One or more tanks may be interlocked together by flexible conduits and used with their own pressure. Thus an interlocking pressurized system can be formed.

Should the tank body 60 become punctured, rupturing only the tank wall, then the foam and inert gas of compartment 68 will merely discharge through the puncture. The intermediate container 62 and the interior gas container 64 will remain, however, under pressure independently and therefore cause no danger to the surrounding environment.

If the puncture would cause a hole through both the tank wall and the intermediate container 62, then the inflammable liquid would be forced by pressure through the rupture hole at the intermediate container wall to contact the foam held in the compartment 68. The foam and the inflammable liquid will become thoroughly mixed as the foam acts upon the volatile liquid and when the mixture exits through the puncture in the tank wall the mixture will be a relatively safe non-volatile neutralized substance.

While the safety tank is being transported it is also available for use as an emergency fire extinguisher. A flexible hose 96, having two conduit lines 120 and 122, and a selectively manual operable valve 124, is connected to quick disconnect couplings 104 and 106. The other ends of conduit lines 120 and 122 are also provided with quick disconnect couplings. Any of the couplings can selectively fit onto the manual valve assembly 124, the carbon dioxide valve assembly 88 or the other quick disconnects 82 and 84. Thus both ends of conduit lines 120 and 122 are provided with quick disconnect couplings which are readily transferable and useable in any transference capacity. The carbon dioxide gas from the bottle 64 has previously pressurized the foam, contained in the area 68 defined between the outer wall of the intermediate container 62 and the tank wall 60. If a fire occurs the valve 124 is manually opened. This causes the pressurized foam to be forced through conduit 89, through flexible hose 120, through selective valve 124 and through the nozzle 100. Consequently, the foam will extinguish the fire when applied directly to the fire. Obviously if a cleaner agent is held in compartment 68 the same procedure could be used to clean the nozzle from the paint previously used.

In addition to the previously stated usage the gas tank can be used singularly or in tandem with an outboard motor 300 as shown in FIG. 5 with the outer compartment 68 being pressurized with an inert gas or foam that would make the tank buoyant. In a modification as shown in FIG. 3 the invention has been converted into a tank truck 200. In this modification the tank illustrated in FIG. 1 has been substantially enlarged with the front end of the truck trailer holding the carbon dioxide container 264. In this embodiment the supporting plates 263 are circumferentially positioned around the intermediate container 262 and the discharge outlet is designed as 206 while the inlet is designated as 284. The embodiment is also provided with pressure relief valves in the same manner as previously disclosed. If desired a separate manifold 211 can be placed in the top of the truck to facilitate loading of the fuel. The outer compartment 267 is preferable filled with a fire extinguishing material.

The embodiment as shown in FIG. 4 is identical to that shown in FIG. 3 except that the tanks are now used in a ship in combination with fire extinguishing apparatus.

As best seen in FIGS. 4, 6 and 7, the double walled safety tank 400 is shown installed into an ordinary passenger car 402 or water craft 500. The installation is performed in any conventional manner, as by brackets, for example. A series of interconnected conduits 404 extend throughout the automobile chassis and ship structure and are in direct communication with the outside compartment of the safety tank. The automobile and ship are also provided with a plurality of fusible link mechanisms 406 or heat sensitive valves which are well known in the art along the series of conduits. The fusible link mechanisms are constructed so as to melt when the heat immediately proximate to the valve reaches a predetermined temperature. If temperature sensitive valves are used then quite obviously they would be constructed so as to open when the heat proximate thereto reaches a predetermined temperature. Thus, it can be seen that the pressurized foam, held within the exterior compartment of the safety tank 400, is capable of being rushed to the site of existing high temperature. The foam will serve to substantially retard combustion, and consequently allow the passengers of the vehicle or ship to possibly escape without serious burns.

In operation, a series of interconnected conduits and fusible link mechanisms are installed in an ordinary passenger automobile or water craft and connected to a novel gasoline tank of the previously described construction. The conduits are pressurized and communicate with the pressurized foam compartment of the safety tank. When sufficient heat is generated to melt the fusible link the mechanism opens allowing the foam from the double walled safety tank to travel through the conduit system under pressure from the $CO_2$ bottle in the internal container, and out through fusible link mechanism into the automobile or water craft. As previously mentioned, the foam from the safety tank will act as a fire extinguisher or fire retardent. The conduits can be prefilled with fire extinguishing material or filled from the safety tank.

In an additional modification the passenger automobile 408 can be equipped with an air bag 410 which can be inflated by the $CO_2$ container within the center cylinder container of the double walled safety tank 412. As best seen in FIG. 7, an ordinary automobile 408 is again provided with the inventive double walled safety tank as a replacement for the traditional automotive gasoline tank. A plurality of impact sensing devices 414 are mounted to the automobile. These impact sensing devices, well known in the art, can be adjusted to activate a valve when the automobile is struck or impacts with a predetermined minimum force.

In operation, when the automobile collides with an object at a predetermined force, greater than the predetermined impact force, the valve will be opened causing the restraining air bag to be fully inflated with $CO_2$ gas from the gas cylinder of the double walled safety tank. This inflation of the safety air bag will occur only when the impact force of the vehicle exceeds the predetermined minimum impact force required to activate the impact sensing means. The impact sensing means will, in turn, cause the valve of the $CO_2$ container to open which allows the free passage of $CO_2$ to the air bag.

Thus it can be seen that many commercial uses are readily adaptable from the present invention in the transfer of volatile fluids from various areas and also in the transfer of volatile fluids for combustion.

While the preferred embodiment of the invention has been disclosed it is understood that the invention is not limited to such an embodiment since it may be otherwise embodied in the scope of the appended claims.

What is claimed is:

1. An inflammable fluid safety tank comprising a double walled tank body, a sleeve means secured to the outer wall structure and inner wall structure of said double walled tank body, said inner wall structure of said tank body forming an intermediate enclosed container, a plurality of support plate members connected to and spacing said outer wall structure from said inner wall structure, the outer wall structure of said double walled tank body being provided with a circular handle, said handle being supported above the tank body by a plurality of mounts, the diameter of said circular handle being greater than the outside diameter of the tank body, fluid transfer means mounted to said outer tank surface and communicating with an outer chamber defined by the inner surface of the tank body's outer wall and the outer wall of the intermediate enclosed container, a second fluid transfer means mounted to said tank body and communicating with said intermediate enclosed container, a pressurized gas container assembly including a pressurized gas container removably mounted to said sleeve means and positioned within said intermediate enclosed container, said gas container assembly comprising means for selectively connecting said gas container for communication with at least one of said fluid transfer means to discharge pressurized gas into said intermediate enclosed container and outer chamber, a first material contained in said intermediate enclosed container and a second material contained in said outer chamber and discharge means mounted to said tank body adapted to selectively discharge pressurized material from either the intermediate enclosed container or the outer chamber.

2. An inflammable fluid safety tank as claimed in claim 1 wherein each of said support plate members defines a plurality of apertures therein and including an end member secured to the inner surface of said outer wall structure and engaging the outer surface of one end of said intermediate enclosed container to support and space said intermediate enclosed container.

3. An inflammable fluid safety tank as claimed in claim 1 wherein each of said fluid transfer means comprises a conduit means extending into said safety tank with quick disconnect means mounted on one end of said conduit means.

4. An inflammable fluid safety tank as claimed in claim 1 wherein said second material is a liquid fire retardant foam.

5. An inflammable fluid safety tank as claimed in claim 1 wherein pressurized gas container comprises a pressurized carbon dioxide bottle.

6. An inflammable fluid safety tank as claimed in claim 1 including pressure release valve means communicating with said intermediate container interior, said pressure release valve means discharging gas from said intermediate container into the atmosphere when said gas reaches a predetermined pressure.

7. A portable safety tank comprising a tank body, a sleeve member secured to said tank body and extending inside said tank body, an intermediate container mounted inside said tank body to said sleeve member, an inner container mounted in said sleeve member, means in said intermediate container to receive a liquid material into its interior, said inner container containing a pressurized inert gas, conduit means connecting said inner container to said intermediate container and allowing selective communication of the pressurized gas from said inner container to said intermediate container and to a compartment defined by the inner wall surface of the intermediate container, a plurality of support means mounted to said tank body inner wall surface extending into said compartment to support and space said intermediate container from said tank body inner wall surface, a second material place in the compartment defined by the inner wall surface of said tank body and the outer wall surface of said intermediate container and discharge means mounted to said tank body, said discharge means being selectively adapted to communicate with said intermediate container and said compartment to discharge the material contained therein, said discharge means including a flexible hose having quick disconnect means on one end and nozzle means of the other end.

8. A portable safety tank as claimed in claim 7 wherein said support members define a plurality of apertures and an end member is connected to said intermediate container and said tank body.

9. A portable safety tank as claimed in claim 7 including a first conduit connected to an inlet formed in said intermediate container, said conduit extending substantially to the bottom of said intermediate container, the other end of said conduit being provided with quick disconnect means, a second conduit connected to the tank body and extending into the compartment formed by the inner wall surface of the tank body and the outer wall surface of the intermediate container, said conduit extending past the bottom of the intermediate container and in proximity to the bottom of the tank body bottom.

10. A portable safety tank as claimed in claim 7 wherein said sleeve member is threaded and adapted to receive said inner container.

11. A portable safety tank as claimed in claim 7 including material level detection means mounted to said tank body, said material level detection means being adapted to indicate the amount of material held in said intermediate container.

12. A fire extinguishing system for a motor vehicle comprising in combination a motor vehicle, an inflammable fluid safety gasoline tank mounted to said vehicle, said safety gasoline tank comprising a double walled tank body, a sleeve means secured to the outer wall structure and inner wall structure of said double walled tank body, said inner wall structure of said tank body forming an intermediate enclosed container, fluid transfer means mounted to said outer tank surface and adapted to communicate with an outer chamber defined by the inner surface of the tank body's outer wall of the intermediate enclosed container and the interior of said intermediate container, a pressurized gas container assembly removably mounted to said sleeve means and positioned within said intermediate enclosed container, said gas container assembly having selectively connected to said fluid transfer means to discharge pressurized gas into said intermediate enclosed container and outer chamber, a fire extinguishing material container in said outer chamber, conduit means mounted to and extending through said vehicle, said conduit means being in communication with said outer chamber of said safety tank, valve means interconnected between said conduit means and said outer chamber, a plurality of heat sensing means located on said conduit means, said heat sensing means providing communication of the conduit means with the atmosphere when a predetermined temperature occurs, said valve means normally being in the closed position, and being activated when said predetermined temperature is reached in the area around said heat sensing means and said conduit means communicates with the atmosphere allowing said material contained in said outer chamber to flow through said conduit means into the atmosphere to retard combustion.

13. A fire retardation system as claimed in claim 12 wherein said heat sensing means comprises fusible links which melt at a predetermined temperature.

14. A fire retardation system as claimed in claim 12 wherein said conduits are prefilled with fire extinguishing material and pressurized by said gas container assembly of said double walled tank body.

15. A fire extinguishing system as claimed in claim 12 wherein the motor vehicle is a ship.

16. A passenger restraint system comprising in combination a motor vehicle, an inflammable fluid safety gasoline tank mounted to said vehicle comprising a double walled tank body, a sleeve means secured to the outer wall structure and inner wall structure of said double walled tank body, said inner wall structure of said tank body forming an intermediate enclosed container, fluid transfer means mounted to said outer tank surface and communicating with an outer chamber defined by the inner surface of the tank body's outer wall and the outer wall of the intermediate enclosed container, a second fluid transfer means mounted to said tank body and communicating with said intermediate enclosed container, a pressurized gas container assembly removably mounted to said sleeve means and positioned within said intermediate enclosed container, said gas container assembly being selectively connected to at least one of said fluid transfer means to discharge pressurized gas into said intermediate enclosed container and outer chamber, a first material contained in said intermediate enclosed container and a second material contained in said outer chamber and discharge means mounted to said tank body adapted to selectively discharge pressurized material from either the intermediate enclosed container or the outer chamber, an inflatable air bag located in the passenger compartment of said vehicle, a conduit connecting said air bag to said pressurized gas container assembly, a two way valve located between said conduit and said gas container assembly, said valve being closed in its normal position, and impact sensing means secured to the vehicle, said impact sensing means serving to open said valve when an impact of a predetermined minimum force occurs so that pressurized gas will flow through said conduit and inflate said air bag.

* * * * *